United States Patent
Mitchell (10) Patent No.: US 8,649,942 B2
(45) Date of Patent: Feb. 11, 2014

(54) SYSTEM AND METHOD FOR CONTROLLING A MATERIAL APPLICATION SYSTEM

(75) Inventor: Wade Steven Mitchell, Buckingham, IA (US)

(73) Assignee: Deere & Company, Moline, IL (US)

( * ) Notice: Subject to any disclaimer, the term of this patent is extended or adjusted under 35 U.S.C. 154(b) by 601 days.

(21) Appl. No.: 12/581,373

(22) Filed: Oct. 19, 2009

(65) Prior Publication Data

US 2010/0298994 A1    Nov. 25, 2010

Related U.S. Application Data

(60) Provisional application No. 61/179,853, filed on May 20, 2009.

(51) Int. Cl.
   *G05D 7/06* (2006.01)
(52) U.S. Cl.
   USPC .............. 701/50; 701/36; 700/283; 111/127; 111/104
(58) Field of Classification Search
   USPC ................ 700/283; 701/50, 36; 111/127, 104
   See application file for complete search history.

(56) References Cited

U.S. PATENT DOCUMENTS

| | | | |
|---|---|---|---|
| 4,052,003 A | 10/1977 | Steffen | |
| 5,172,861 A | 12/1992 | Lenhardt | |
| 5,278,423 A | 1/1994 | Wangler et al. | |
| 5,539,669 A | 7/1996 | Goeckner et al. | |
| 5,755,382 A | 5/1998 | Skotinkov | |
| 5,884,205 A | 3/1999 | Elmore et al. | |
| 5,950,921 A | 9/1999 | Cain et al. | |
| 5,971,294 A * | 10/1999 | Thompson et al. | 239/76 |
| 5,991,687 A | 11/1999 | Hale et al. | |
| 6,126,088 A * | 10/2000 | Wilger et al. | 239/170 |
| 6,529,615 B2 | 3/2003 | Hendrickson et al. | |
| 6,694,260 B1 | 2/2004 | Rekow | |
| 6,810,315 B2 * | 10/2004 | Cessac | 701/50 |
| 7,395,769 B2 * | 7/2008 | Jensen | 111/121 |
| 7,555,990 B2 * | 7/2009 | Beaujot | 111/123 |
| 7,896,258 B2 * | 3/2011 | Hoisington et al. | 239/155 |
| 8,352,130 B2 | 1/2013 | Mitchell | |
| 2002/0107609 A1* | 8/2002 | Benneweis | 700/231 |
| 2003/0159633 A1* | 8/2003 | Upadhyaya et al. | 111/200 |
| 2004/0094203 A1* | 5/2004 | Nimberger | 137/327 |
| 2004/0148057 A1 | 7/2004 | Breed et al. | |
| 2008/0051255 A1 | 2/2008 | Ringer | |
| 2008/0269988 A1 | 10/2008 | Feller et al. | |
| 2009/0224084 A1* | 9/2009 | Hoisington et al. | 239/754 |
| 2010/0298994 A1* | 11/2010 | Mitchell | 700/283 |

FOREIGN PATENT DOCUMENTS

| | | |
|---|---|---|
| DE | 29908919 | 8/1999 |
| EP | 0726024 | 6/1998 |
| EP | 0864369 | 9/1998 |
| WO | 93/04434 | 3/1993 |

* cited by examiner

*Primary Examiner* — Thomas Black
*Assistant Examiner* — Wae Louie (57) ABSTRACT

An engine speed sensor determines engine speed data of an internal combustion engine for moving a material distribution vehicle. A ground speed sensor measures a ground speed of the material distribution vehicle. A data processor for controlling a dispensation system to distribute an agricultural input or material at a rate based on the measured ground speed and the engine speed data (e.g., sensed engine speed or change in engine speed) to anticipate a change in the ground speed of the material dispensation vehicle such that a lag in the rate of agricultural input delivered is reduced.

20 Claims, 9 Drawing Sheets

SYSTEM AND METHOD FOR CONTROLLING A MATERIAL APPLICATION SYSTEM

This document (and the accompanying drawings) claims the benefit of the filing date of provisional patent application No. 61/179,853, filed May 20, 2009 under 35 U.S.C. §119(e) or as otherwise provided under applicable law.

FIELD OF THE INVENTION

This invention relates to a system and method for controlling a material application system.

BACKGROUND OF THE INVENTION

A material application system or sprayer may be used to apply, distribute, dispense or spray agricultural inputs on a field at controlled rate. Agricultural inputs may comprise fertilizer, insecticides, herbicides, fungicides, and other chemicals, compounds, or mixtures. Agricultural inputs may be used to treat seeds, roots, plants or the soil, for example. Although the controlled rate of dispensing may compensate for an observed velocity of the material application system that is moved by a vehicle, there is often a lag associated with the observed velocity and the actual velocity and another lag associated with the observed velocity and actual dispensation onto the field. Thus, there is need to reduce or minimize the effects of such lag, which may result in less accurate dispensing of agricultural inputs than otherwise desired.

SUMMARY OF THE INVENTION

In accordance with one embodiment, an operator control position sensor senses or detects a change in control position of an operator control device for controlling a position of a propulsion system for moving a material distribution vehicle. A ground speed sensor measures a ground speed of the material distribution vehicle. A data processor for controlling a dispensation system to distribute an agricultural input or material at a distribution rate based on the measured ground speed and the sensed change in the control position data to anticipate a change in the ground speed of the material distribution vehicle such that a lag (that otherwise would occur) in the rate of agricultural input delivered is reduced.

DESCRIPTION OF THE PREFERRED EMBODIMENT

Figure 1:
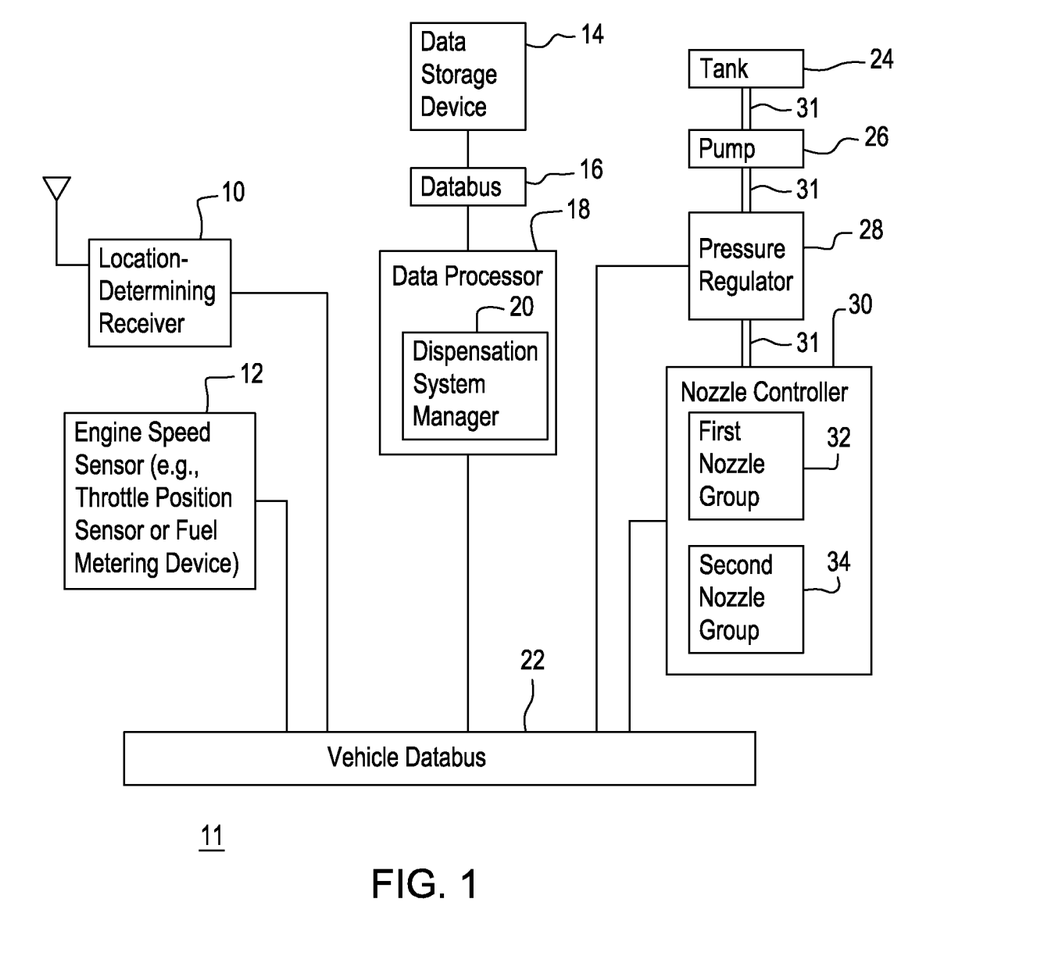
FIG. 1 is a block diagram of one embodiment of a system for controlling a material application system.

In accordance with the embodiment of FIG. 1, a material application system 11 (e.g., sprayer) is adapted for the metered or controlled dispensation of an agricultural input onto a field, the soil or the plants in the field. An agricultural input may comprise fertilizer, insecticides, herbicides, fungicides, and other chemicals, compounds, or mixtures. The agricultural input may be in the form of a liquid, a concentrate, a spray, pellets, powder, or granular form, for instance.

In FIG. 1, a material application system 11 comprises an engine speed sensor 12, a location-determining receiver 10, a data processor 18, a pressure regulator 28, and a nozzle controller 30 coupled to a vehicle data bus 22. The data processor 18 communicates with one or more of the following components via the vehicle data bus 22: the engine speed sensor 12, the location-determining receiver 10, a data processor 18, a pressure regulator 28, and a nozzle controller 30. The data processor 18 communicates with a data storage device 14 via a secondary data bus 16.

The pressure regulator 28 is interposed in or connected to one or more dispensation lines 31 (e.g., tubes, pipe or conduit) between the pump 26 and the first nozzle group 32. Similarly, the pressure regulator 28 is interposed or connected to one or more lines 31 between the pump 26 and the second nozzle group 34. The pump 26 may be disposed in the tank 24 or may be connected to the tank 24 via a line 31 (e.g., a tube, pipe or conduit). The material application system may be propelled by, carried by or mounted on a material distribution vehicle or material dispensation vehicle (e.g., sprayer vehicle).

In one embodiment, the location-determining receiver 10 comprises a global positioning system (GPS) receiver. The location-determining receiver 10 provides one or more of the following: location data or position data (e.g., geographic coordinates) for the vehicle and a velocity or ground speed of the vehicle. In one example, the location-determining receiver 10 may be associated with a secondary receiver that receives a differential correction signal to augment or improve the accuracy of an estimated position or location of a material dispensation vehicle.

In an alternate embodiment, the location-determining receiver 10 may comprise a location-determining receiver that receives signals from one or more reference transmitters at known locations to estimate a position of the location-determining receiver 10; hence, the material dispensation vehicle. In another alternate embodiment, the location-determining receiver 10 may be replaced with an odometer or another dead-reckoning system to estimate a location or position of the vehicle with respect to a reference point (e.g., reference geographic coordinates).

The engine speed sensor 12 comprises a tachometer, a throttle position sensor, a fuel metering device or another device for measuring, directly or indirectly, a rotational velocity of an engine shaft (e.g., a crankshaft) of an internal combustion engine or a propulsion system that propels or moves the system 11 or related engine speed data. Engine speed data means engine speed, adjusted engine speed, or a change in engine speed or a change in adjusted engine speed. The propulsion system may comprise an electric motor or a hybrid drive system for propelling the vehicle. A hybrid drive system means an internal combustion engine, which drives a generator or alternator, that supplies generated electrical energy to an electric motor for propelling the vehicle.

In a first example, the engine speed sensor 12 comprises a throttle position sensor, where the throttle position sensor refers to a device for sensing a throttle position or throttle opening (e.g., of a throttle body or air flow metering device) or change in the throttle position or throttle opening to determine the throttle opening is opened to increase the flow of air or a fuel air mixture delivered to an intake of the internal combustion engine. The throttle position or change in throttle position may be expressed as (or highly correlated to) an engine speed or change in engine speed, respectively.

In a second example, the engine speed sensor 12 comprises an electronic sensor or fuel injection system controller for sensing of a fuel injection rate into the internal combustion engine.

In a third example, the engine speed sensor 12 comprises a magnetic field sensor that is stationary and that senses the magnetic field associated with a magnet mounted on a rotatable shaft (e.g., crankshaft) of the internal combustion engine of the vehicle to count the number of rotations or revolutions of the shaft per unit time. The magnetic field sensor may be associated with a clock for tracking time and a counter circuit for tracking the number of revolutions or rotations of the shaft, for example.

In a fourth example, the engine speed sensor 12 comprises a sensor for sensing a material change in the position (e.g., material change in angle) of an operator controllable mechanism, handle, slidable handle, rotatable knob, or joystick for adjusting the speed or propulsion of the vehicle. The sensor may comprise a variable resistor, a potentiometer, a magnetic field sensor, a Hall Effect sensor, a piezoelectric sensor, a joystick, an optical position sensor, or another electronic device associated with or operably connected to the operator's handle for adjusting the speed or propulsion of the vehicle. Once the operator changes the position of the operator controllable mechanism, the sensor generates a signal or data message that can be used by the data processor 18 or the dispensation system manager 20 prior to the vehicle actually changing its speed or acceleration to reduce or eliminate the time lag that would otherwise be associated with an upcoming change in future vehicle speed. The data processor 18 estimates or predicts the upcoming change in future vehicle speed based on the immediately prior change in the position of the operator controllable mechanism.

In a fifth example, the engine speed sensor 12 comprises a sensor for sensing a material change in the position (e.g., material change in angle) of a pedal (e.g., foot-operated pedal) for adjusting the speed or propulsion of the vehicle by an operator. The sensor may comprise a variable resistor, a potentiometer, a magnetic field sensor, a Hall Effect sensor, a piezoelectric sensor, an optical position sensor, or another electronic device associated with or operably connected to the operator's pedal for adjusting the speed or propulsion of the vehicle. Once the operator changes the position of the operator controllable mechanism, the sensor generates a signal or data message that can be used by the data processor 18 or the dispensation system manager 20 prior to the vehicle actually changing its speed or acceleration to reduce or eliminate the time lag that would otherwise be associated with an upcoming change in future vehicle speed. The data processor 18 estimates or predicts the upcoming change in future vehicle speed based on the immediately prior change in the position of the operator controllable mechanism.

The data processor 18 may comprise a microprocessor, a microcontroller, an application specific programming device, a programmable logic array, or another device for processing data. In one embodiment, the data processor 18 further comprises a dispensation system manager 20 (e.g., spray system manager). The dispensation system manager 20 may determine the rate of application of the agricultural input to a corresponding location or position of the field.

The data processor 18 or dispensation system manager 20 may receive estimated location data or position data of the dispensation vehicle or dispensation system along with one or more of the following input data: (a) engine speed data (e.g., throttle position data) from the engine speed controller, (b) gear selection data (e.g., gear ratio data) from a transmission controller or transaxle controller coupled to the vehicle data bus 22, (c) adjusted engine speed data comprising the engine speed data (from the engine speed controller) adjusted for the gear selection data (from a transmission controller or transaxle controller, (d) prescription data for application of the agricultural input based on location of the vehicle or dispensation system, (e) target application data (for the agricultural input) rate versus position or location data of the vehicle from the data storage device 14, ground speed of the vehicle from the location-determining receiver 10 ground speed sensor, and (f) dispensation time lag of an agricultural input versus engine speed data and ground speed data. The data processor 18 or dispensation system manager 20 may use the foregoing input data to generator a suitable control signal or control data for at least one of the pressure regulator 28 and the nozzle controller 30 to control the dispensation, release or distribution of the material or the agricultural input. For example, if the throttle position is opened or increased, the data processor 18 or the dispensation system manager 20 may instantaneously increase the rate of application of the agricultural input (e.g., by sending a signal to the nozzle controller 30) in proportion to the increase in the throttle opening.

The data storage device 14 is capable of storing and facilitating retrieval of stored data. For example, the data storage device 14 may store one or more of the following data: (a) target application rate (of the agricultural input) versus position or location data from the data storage device 14 and (b) dispensation time lag of an agricultural input versus engine speed data and ground speed data.

The tank 24 is capable of holding and storing the agricultural input. The agricultural input in the tank 24 may be applied, distributed, dispensed, or depleted during the operation of the material application system 11. The lines 31 that interconnect the pressure regulator 28 with the first nozzle group 32 and the second nozzle group 34 may comprise conduit, pipes, or tubes. If the agricultural input is in the form of liquid a concentrate or a spray, the lines 31 may carry the agricultural input in liquid form.

However, in an alternate embodiment if the agricultural input is in the form a pellets, powder or granular form, the lines 31 may carry the agricultural input pneumatically or separate pneumatic and material-conveying lines (e.g. gravity fed lines from an elevated tank (e.g., 24)) may be routed to the first nozzle group 32 and the second nozzle group 34.

The pump 26 comprises one or more of the following devices: a pump, a liquid pump, an air pump, a vacuum pump, or a pneumatic pump. The pressure regulator 28 may comprise any device for regulating the flow or pressure of an agricultural input, or an aqueous or oil-based mixture containing the agricultural input. In one example, the pressure regulator 28 comprises a liquid pressure regulator, whereas in another example the pressure regulator 28 comprises a pneumatic pressure regulator.

The pressure regulator 28 may detect and maintain a certain pressure level or pressure level range in dispensation lines 31. For example, the pressure regulator 28 may detect and maintain a certain pressure level range between the pump 26 and the first nozzle group 32 and the second nozzle group 34.

The nozzle controller 30 may switch on or off the first nozzle group 32, the second nozzle group 34, or control the opening size or level of each nozzle in the first nozzle group 32 and the second nozzle group 34, for instance. The first nozzle group 32 and the second nozzle group 34 may each comprise one or more nozzles that are controlled by corresponding solenoids, or other electromechanically operated valves or openings. The nozzle controller 30 may send a control signal, logic signal or control data to the solenoids or electromechanically operated valves or openings of the nozzles (32, 34).

Figure 2:
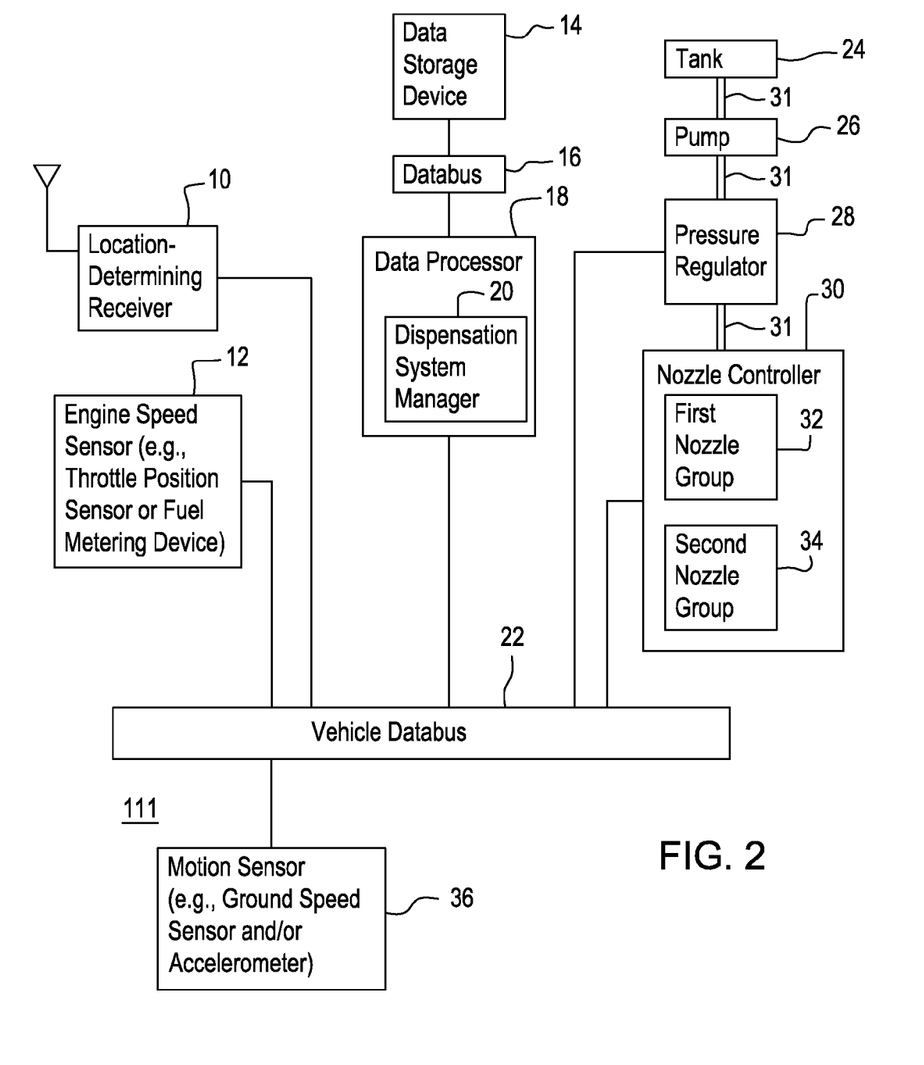
FIG. 2 is a block diagram of another embodiment of a system for controlling a material application system.

The system 111 of FIG. 2 is similar to the system 11 of FIG. 1 except the system 111 of FIG. 2 further comprises a motion sensor 36. The motion sensor 36 is coupled to the vehicle data bus 22. In one embodiment, the motion sensor 36 may comprise a ground speed sensor that estimates a ground speed or velocity of the vehicle. In another embodiment, the motion sensor 36 comprises an accelerometer or other device for determining the acceleration of the vehicle. For example, the motion sensor 36 may comprise the combination of an accelerometer coupled to an integrator such that the output of the accelerometer is vehicular acceleration data and the output of the integrator is vehicle velocity data, where both acceleration data and vehicle velocity (or ground speed data) is made available to the data processor 18 or the dispensation system manager 20.

The nozzle controller 30 may send a control signal, logic signal or control data to the solenoids or electromechanically operated valves or openings of the nozzles (32, 34). For example, if the vehicle is turning or following a curved path (e.g., detectable via a motion sensor 36), the nozzle controller 30 may send a first signal to an outer nozzle (e.g., 32 or 34), and a second signal to an inner nozzle, where the first signal sends more agricultural input to the outer nozzle than the second signal sends to the inner nozzle, where the outer nozzle refers to a nozzle (of the first nozzle group 32 or second nozzle group 34) closest to an outer radius of the turn or curved path of the vehicle, and where the inner nozzle refers to a nozzle (of the first nozzle group 32 or second nozzle group 34) closest to an inner radius of the turn or curved path of the vehicle. Further, the nozzle controller 30 may adjust the respective distribution rates of agricultural input from the first nozzle group 32 and the second nozzle group 34 to compensate for turning or curved paths of the vehicle such that the amount of material distributed over the plants or ground is generally uniform regardless of whether the plant or ground falls in the inside or outside of a turning radius of the vehicle.

Figure 3:
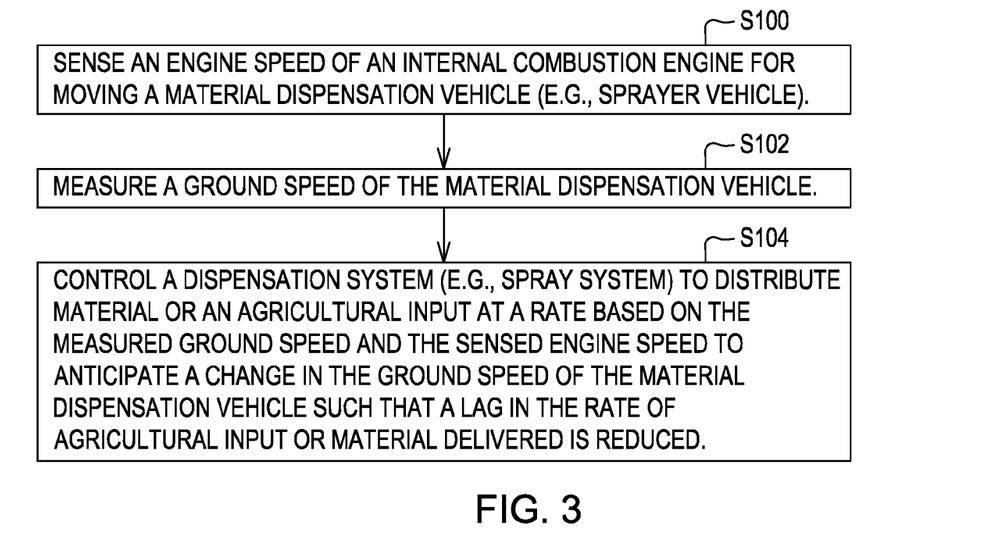
FIG. 3 is a flow chart of one example of a method for controlling a material application system.

FIG. 3 is a flow chart of method for managing or controlling a material application system that is propelled by, mounted on, or carried by a material dispensation vehicle. The method in FIG. 3 starts in step S100.

In step S100, an engine speed sensor 12 senses or detects engine speed data (e.g., engine speed or change in engine speed) of an internal combustion engine for moving a material dispensation vehicle (e.g., sprayer vehicle). The engine speed may be associated with the rotational speed of a crankshaft of an internal combustion engine, for example. Step S100 may be carried out in accordance with various procedures that may be applied alternately or cumulatively. Under a first procedure for carrying out step S100, the engine speed sensor 12, as a throttle position sensor, senses a throttle position or throttle opening (e.g., of a throttle body or air flow metering device) or change in the throttle position or throttle opening to derive an engine speed proportional to the throttle position or throttle opening. Here, the engine speed sensor 12 determines whether or not the throttle opening is opened to increase the flow of air or a fuel air mixture delivered to an intake of the internal combustion engine. The throttle position or change in throttle position may be expressed as (or highly correlated to) an engine speed or change in engine speed, respectively.

Under a second procedure, the engine speed sensor 12, as an electronic sensor or fuel injection system controller, senses a fuel injection rate into the internal combustion engine, where the fuel injection rate may be expressed as an engine speed or a change in engine speed. Under a third procedure, the engine speed sensor 12 as a magnetic field sensor senses the magnetic field associated with a magnet mounted on a rotatable shaft (e.g., crankshaft) of the internal combustion engine of the vehicle to count the number of rotations or revolutions of the shaft per unit time. Under a fourth procedure for carrying out step S100, the engine speed may comprise an adjusted engine speed adjusted by gear selection data (e.g., gear ratio) from a transmission controller or transmission axle controller coupled to the vehicle data bus 22.

In step S102, a ground speed sensor or a motion sensor 36 determines a ground speed (or velocity) of the material dispensation vehicle (e.g., sprayer vehicle).

In step S104, a data processor 18 or dispensation system manager 20 controls a dispensation system to distribute material or an agricultural input at a rate based on the measured ground speed and engine speed data (e.g., the sensed engine speed or adjusted engine speed) to anticipate a change in the ground speed (or velocity) of the material dispensation vehicle such that a lag in the distribution rate (or application rate) of agricultural input or material is reduced. Step S104 may be carried out in accordance with various techniques that may be applied alternately or cumulatively. Under a first technique, step S104 is carried out by retrieving the following data from the data storage device 14: dispensation time lag of an agricultural input versus engine speed data (e.g., change in engine speed) and ground speed data. The dispensation time lag may be compensated for by the data processor 18 or the dispensation system manager 20 advancing or adjusting the dispensing of material by the dispensation time lag. The dispensation time lag may depend upon settings of the material application system 11 (e.g., sprayer system) including one or more of the following factors or a time duration allowance associated with each factor: (a) viscosity or specific gravity of the agricultural input to be distributed via the material application system 11, (b) pressure level or pressure range of the pressure regulator 28, (c) nozzle opening size or nozzle type of the nozzle groups (32,34), (d) length of lines 31 from the pump 26 to the first nozzle group 32 and the second nozzle group 34, (e) operating pressure (e.g., head) and flow rate (e.g., in liters per minute or gallons per minute) of the pump 26.

Under a second technique, step S104 is carried out by estimating a future ground speed of the vehicle based on the engine speed data (e.g., engine speed or change in engine speed) and the current ground speed to reduce a time lag for the rate of distribution of the material or the agricultural input. In other words, the next ground speed of the vehicle at a next vehicular position is estimated (or predetermined prior to arrival of the vehicle at the next vehicular position) based not only on the current ground speed, but based on the current ground speed (or adjusted engine speed) and the engine speed at the current vehicle position. By including the engine speed (or adjusted engine speed) as a factor in the estimate of the next ground speed, any changes to the vehicle speed are immediately anticipated as soon as a user or controller changes a setting of the throttle or a fuel metering device (e.g., responsive to pressing or releases the gas pedal), rather than when the vehicle is actually propelled at the new ground speed. The data processor 18 or dispensation system manager 20 can decrease the rate of application or distribution of material for decreases in ground speed of the vehicle as soon as the engine speed sensor 12 detects a change in the engine speed and the change is processed or interpreted by the data processor 18, as opposed to the location-determining receiver 10 or motion sensor 36 later detecting a change in the vehicle velocity or ground speed. Similarly, the data processor 18 or dispensation system manager 20 can increase the rate of application or distribution of material for increases in the ground speed of the vehicle as soon as the engine speed sensor 12 detects a change in the engine speed and the change is processed or interpreted by the data processor 18, as opposed to the location-determining receiver or motion sensor 36 detecting a change in the vehicle velocity or ground speed.

Under a third technique, the data processor 18 or dispensation system manager 20 controls the material application system 11 as a spraying system at a spray rate based on the measured ground speed and the senses engine speed to anticipate a change in the ground speed of the vehicle such that time lag in the delivered rate of agricultural input fluid or liquid is reduced.

Figure 4:
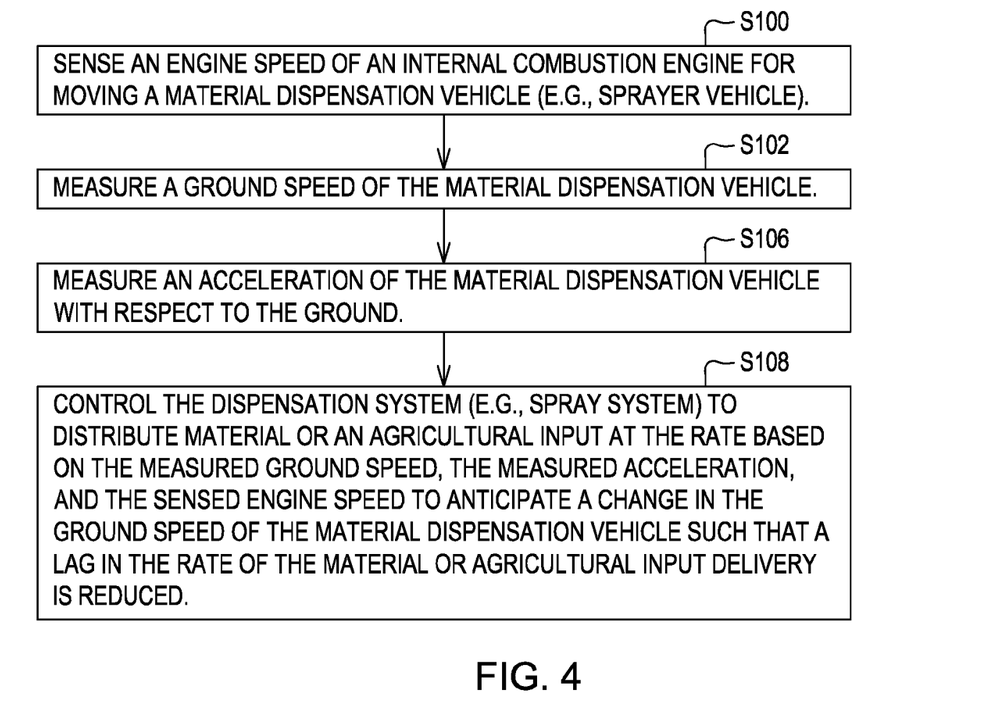
FIG. 4 is a flow chart of another example of a method for controlling a material application system.

FIG. 4 discloses another method for managing or controlling a material dispensation system. The method of FIG. 4 is similar to that of FIG. 3, except the method of FIG. 4 replaces step S104 with steps S106 and S108. Like reference numbers in FIG. 3 and FIG. 4 indicate like steps or procedures.

In step S100, an engine speed sensor 12 senses or detects engine speed data (e.g., engine speed or change in engine speed) of an internal combustion engine for moving a material dispensation vehicle. The engine speed may be associated with the rotational speed of a crankshaft of an internal combustion engine, for example.

In step S102, a ground speed sensor or a motion sensor 36 determines a ground speed or velocity (e.g., instantaneous velocity) of the material dispensation vehicle.

In step S106, a motion sensor 36 or accelerometer measures acceleration (e.g., instantaneous acceleration) of the material dispensation vehicle.

In step S108, a data processor 18 or dispensation system manager 20 controls a dispensation system to distribute material or an agricultural input at a distribution rate based on the measured ground speed, the measured acceleration and the sensed engine speed data (e.g., sensed engine speed or adjusted engine speed or change in engine speed) to anticipate a change in the ground speed of the material dispensation vehicle such that a lag in the rate of agricultural input or material is reduced.

Step S108 may be carried out in accordance with various techniques that may be applied alternately or cumulatively. Under a first technique, step S108 is carried out by retrieving the following input data from the data storage device 14: (a) dispensation time lag of an agricultural input versus engine speed data of the material dispensation vehicle and ground speed data of the material dispensation vehicle, or (b) a dispensation time lag of the agricultural input versus engine speed data, ground speed data and vehicular acceleration data of the material dispensation vehicle. The dispensation time lag may be compensated for by advancing or adjusting the dispensing of material by the dispensation time lag. The dispensation time lag may depend upon settings of the material application system (e.g., sprayer system 11 or 111) including one or more of the following factors or a time duration allowance associated with each factor: (a) viscosity or specific gravity of the agricultural input to be distributed, (b) pressure level or pressure range of the pressure regulator 28, (c) nozzle opening size or nozzle type of the nozzle groups (32, 34), (d) length of lines 31 from the pump 26 to the first nozzle group 32 and the second nozzle group 34, (e) operating pressure (e.g., head) and flow rate (e.g., in liters per minute or gallons per minute) of the pump 26.

Under a second technique, step S108 is carried out by estimating a future ground speed of the vehicle based on the current engine speed (e.g., a change in the engine speed), the current ground speed and current acceleration to reduce a time lag for the rate of distribution of the material or the agricultural input by the material application system (11 or 111). In other words, the next ground speed of the vehicle at a next vehicular position is estimated (or predetermined prior to arrival of the vehicle at the next vehicular position) based not only on the current ground speed, but based on the combination of the current ground speed, current acceleration and the current engine speed (e.g., change in engine speed) at the current vehicle position. By including the current engine speed (e.g., change in engine speed) and current acceleration as a factor in the estimate of the next ground speed, any changes to the vehicle speed are immediately anticipated as soon as a user or controller changes a setting of the throttle or fuel metering device (e.g., responsive to an operator pressing or releasing the gas pedal) and it is interpreted or processed by a data processor 18, rather than when the vehicle is actually propelled at or actually reaches the new ground speed. After the user changes the engine speed based on the setting of the throttle or fuel metering device, the vehicle subsequently reaches a new ground speed based on the change in the setting of the throttle or fuel metering device, for example.

Under the second technique for carrying out step S108, the data processor 18 or dispensation system manager 20 can decrease the rate of application or distribution of material for decreases in ground speed of the vehicle (e.g., material dispensation vehicle) as soon as the engine speed sensor 12 detects a change in the engine speed and the change is processed or interpreted by a data processor 18, as opposed to the location-determining receiver 10 or motion sensor 36 detecting a change in the vehicle velocity or ground speed. Similarly, the data processor 18 or dispensation system manager 20 can increase the rate of application or distribution of material for increases in the ground speed of the vehicle as soon as the engine speed sensor 12 detects a change in the engine speed and the change is processed or interpreted by the data processor 18, as opposed to the location-determining receiver 10 or motion sensor 36 detecting a change in the vehicle velocity or ground speed.

Figure 5:
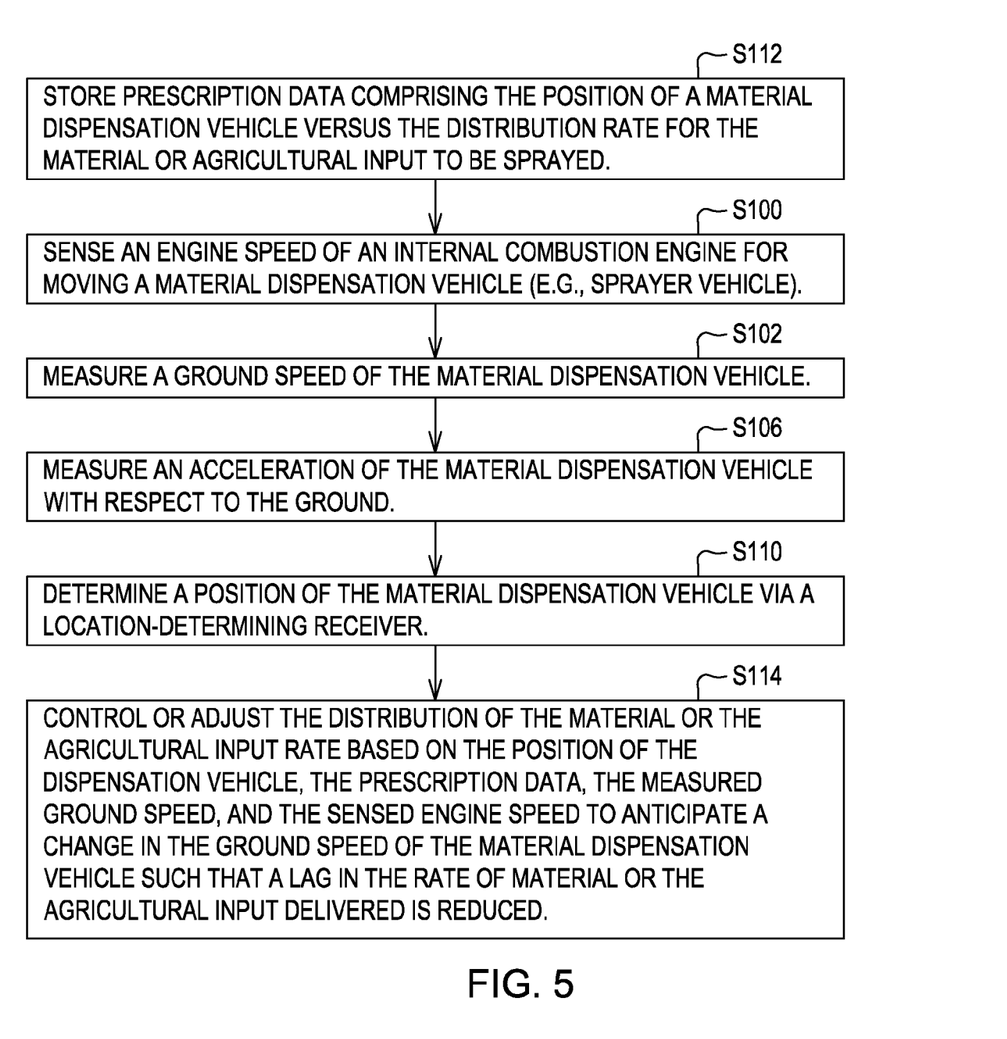
FIG. 5 is a flow chart of yet another example of a method for controlling a material application system.

FIG. 5 discloses another embodiment of a method for controlling a material dispensation system.

In step S100, an engine speed sensor 12 senses or detects engine speed data (e.g., an engine speed or a change in engine speed) of an internal combustion engine for moving a material dispensation vehicle. The engine speed may be associated with the rotational speed of a shaft (e.g., crankshaft) of an internal combustion engine.

In step S102, a motion sensor 36 (e.g., ground speed sensor) or location-determining receiver 10 determines or estimates a ground speed of the material dispensation vehicle.

In step S106, a motion sensor 36 or accelerometer measures an acceleration of the material dispensation vehicle.

In step S110, a location-determining receiver 10 determines a position of the material dispensing vehicle.

In step S114, a data processor 18 controls or adjusts the distribution rate of the material or the agricultural input based on the position of the material dispensing vehicle, the prescription data, the measured ground speed, and the sensed engine speed data (e.g., sensed engine speed or the change in the engine speed) to anticipate a change in the ground speed of the material dispensing vehicle such that a lag in the rate of material or the agricultural input delivered is reduced.

Step S114 may be carried out in accordance with various techniques that may be applied alternately or cumulatively. Under a first technique, step S114 is carried out by retrieving the following data from the data storage device 14: dispensation time lag of the agricultural input versus engine speed data, ground speed data, vehicular acceleration data, vehicular position and prescription data. The dispensation time lag may be compensated for by advancing the dispensing of material by the dispensation time lag. The dispensation time lag may depend upon settings of the dispensation system (e.g., sprayer system) including one or more of the following factors or a time duration allowance associated with each factor: (a) viscosity or specific gravity of the agricultural input to be distributed, (b) pressure level or pressure range of the pressure regulator 28, (c) nozzle opening size or nozzle type, (d) length of lines 31 from the pump 26 to the first nozzle group 32 and the second nozzle group 34, (e) operating pressure and flow rate (e.g., in liters per minute or gallons per minute) of the pump 26.

Under a second technique, step S114 is carried out by estimating a future ground speed of the vehicle based on the current engine speed (e.g., a change in engine speed), the current ground speed a current acceleration, vehicular position, and prescription data to reduce a time lag for the rate of distribution of the material or the agricultural input. In other words, the next ground speed of the vehicle at a next vehicular position is estimated based not only on the current ground speed, but based on the current ground speed, current acceleration, vehicular position, prescription data and the engine speed (e.g., change in engine speed) at the current vehicle position. By including the current engine speed (e.g., change in engine speed) and current acceleration as factors in the estimate of the next ground speed, any changes to the vehicle speed are immediately anticipated as soon as a user or controller changes a setting of the throttle or fuel metering device (e.g., by pressing or releasing the gas pedal) and processed by the data processor 18, rather than when the vehicle is actually propelled at or reaches the new ground speed. The data processor 18 or dispensation system manager 20 can decrease the rate of application or distribution of material for decreases (or anticipated decreases) in ground speed of the vehicle as soon as the engine speed sensor 12 detects a change in the engine speed and the change is processed by the data processor 18, as opposed to the location-determining receiver 10 or motion sensor 36 detecting a resultant change in the vehicle velocity or ground speed. Similarly, the data processor 18 or dispensation system manager 20 can increase the rate of application or distribution of material for increases in the ground speed of the vehicle as soon as the engine speed sensor 12 detects a change in the engine speed, as opposed to the location-determining receiver 10 or motion sensor 36 detecting a change in the vehicle velocity or ground speed.

Figure 6:
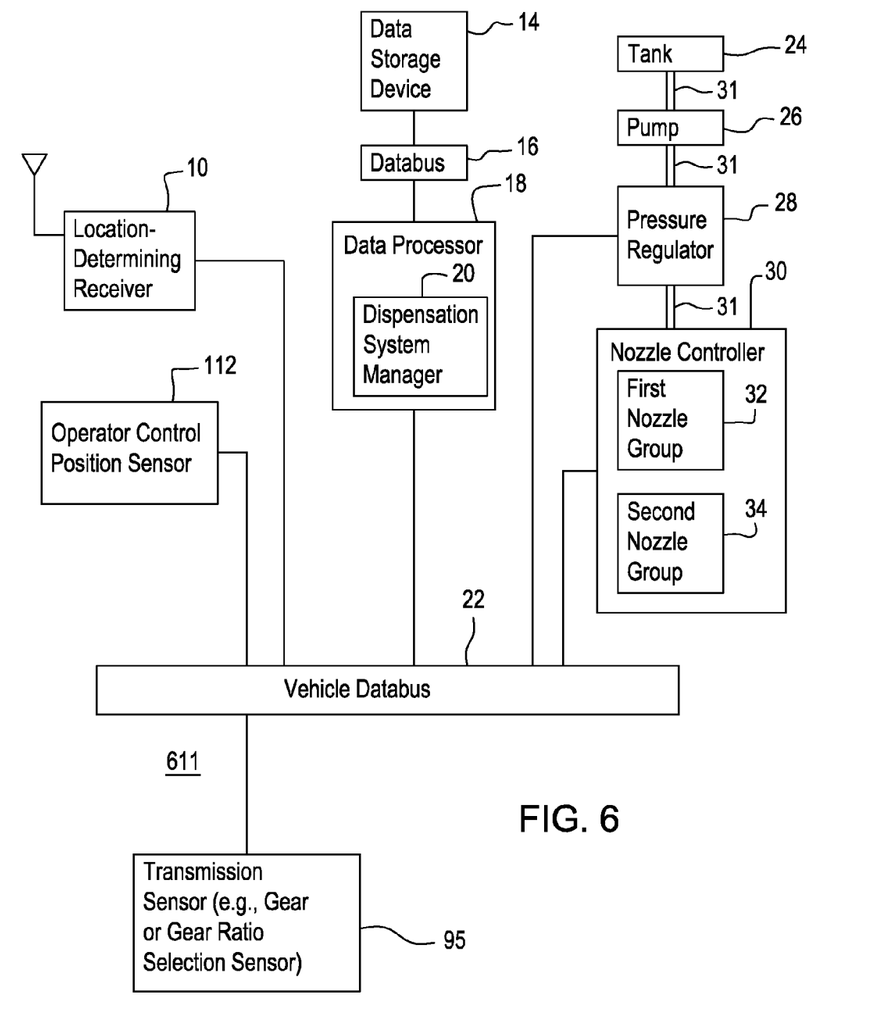
FIG. 6 is a block diagram of an additional embodiment of a system for controlling a material application system.

The system 611 of FIG. 6 is similar to the system 11 of FIG. 1, except the system 611 further comprises a transmission sensor 95 coupled to the vehicle data bus 22 and the engine speed sensor 12 is replaced with an operator control position sensor 112. Like reference numbers in FIG. 6 and FIG. 11 indicate like elements.

The transmission sensor 95 comprises a gear or gear ratio selection sensor. The transmission sensor 95 may provide a signal or data message on the selected or current gear ratio (e.g., or selected or current gear) of the transmission of the vehicle to the data processor 18 or dispensation system manager 20.

The transmission sensor 95 may be associated with an electronic control unit for a transmission. In one arrangement, the transmission sensor 95 comprises a first rotational speed sensor associated with an input shaft of the transmission, a second speed sensor associated with a an output shaft of the transmission, a data processor for determining a ratio or gear ratio between a first rotational speed of the input shaft and a second rotational speed of the output shaft, and a sending unit (e.g., a transmitter and encoder) for generating a signal, an encoded signal (e.g., pulse modulation) or data message indicative of the detected ratio or gear ratio.

The operator control position sensor 112 detects a position or change in position of an operator control device (e.g., propulsion handle) or user interface for controlling the propulsion unit. For instance, the operator control position sensor 112 may comprise a variable resistor, a potentiometer, a Hall Effect sensor, a magnetic field sensor or another sensor associated with the operator control device. The operator control device may comprise one or more of the following: an accelerator pedal, a foot pedal, a lever, a switch, a rotatable knob, a joystick, a slidable control device, or another control device for the operator's control of the propulsion system of the vehicle.

Figure 7:
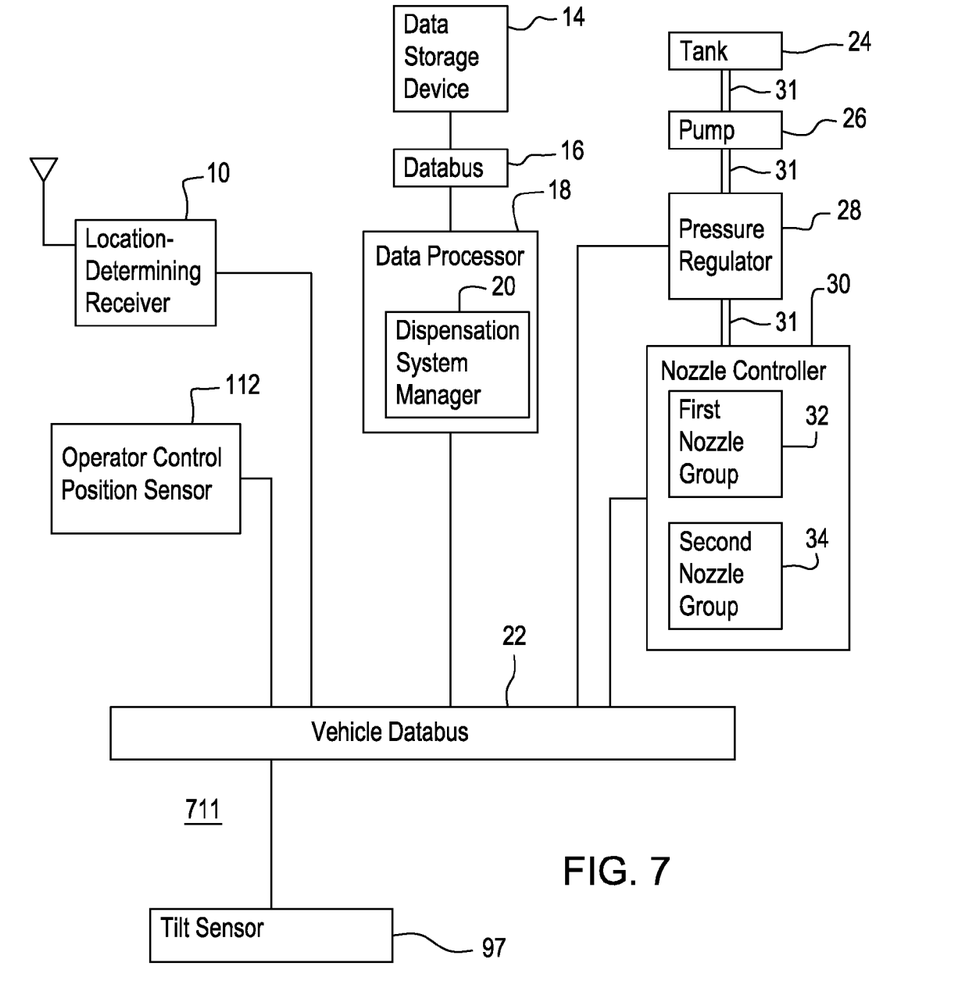
FIG. 7 is a block diagram of another additional embodiment of a system for controlling a material application system.

The system 711 of FIG. 7 is similar to the system 11 of FIG. 1, except the system 711 further comprises a tilt sensor 97 coupled to the vehicle data bus 22 and the engine speed sensor 12 is replaced with an operator control position sensor 112. Like reference numbers in FIG. 6, FIG. 7 and FIG. 11 indicate like elements.

The tilt sensor 22 may comprise one or more accelerometers mounted or secured to the vehicle. For example, the tilt sensor 22 may comprise two or three accelerometers associated with different axial orientations (e.g., multi-axial accelerometers, a two-axis accelerometer or a three-axis accelerometer) with respect to the vehicle to detect whether the vehicle is tilted upward or downward in the direction of travel.

In one arrangement, a first accelerometer of the tilt sensor 22 is secured to or mounted on front portion of the vehicle, whereas a second accelerometer of the tilt sensor 22 is secured to or mounted on a rear portion of the vehicle. In such an arrangement, the tilt sensor 22 may comprises an evaluator for evaluating whether the first accelerometer measurements differ from second accelerometer measures indicative of the tilt of the vehicle. Accordingly, the tilt of the vehicle may be detected by a first acceleration level at the first accelerometer and a second acceleration level at the second accelerometer. In one example when the vehicle is tilted upward or downward in the direction of travel, the first acceleration level may tend to be somewhat opposite to the second change in acceleration level in magnitude and direction.

Figure 8:
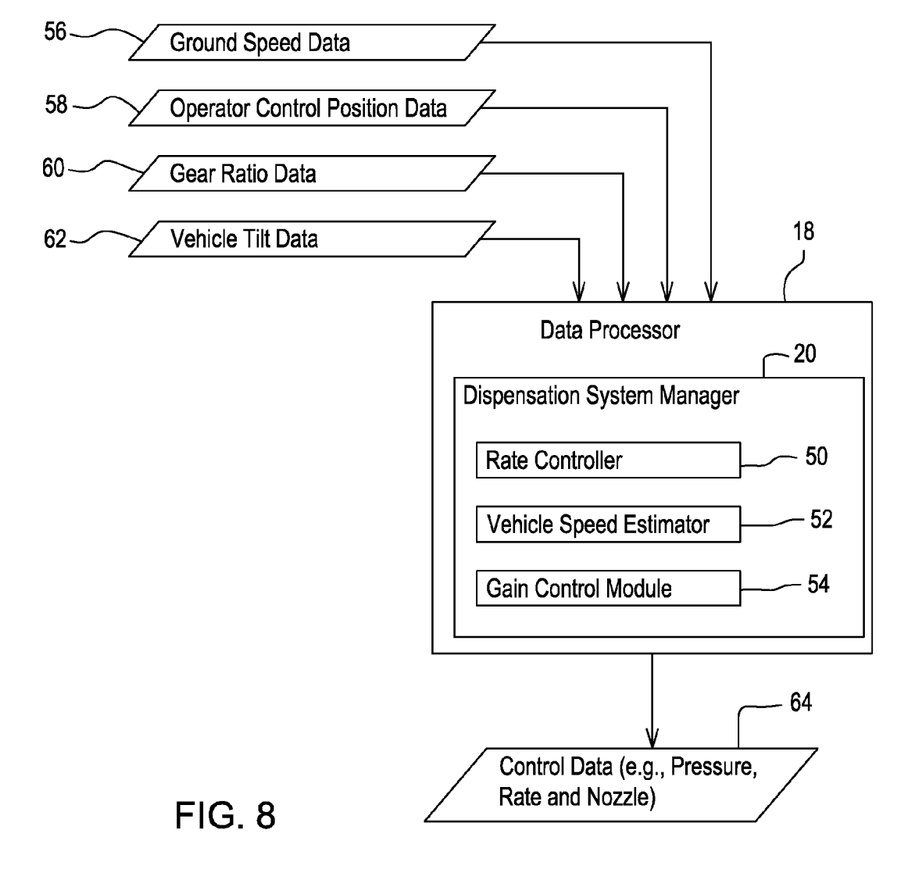
FIG. 8 is a block diagram that illustrates one possible configuration of the data processor in greater detail.

FIG. 8 illustrates the flow of input data inputted into the data processor 18 and the flow of output data outputted by the data processor 18. Like reference numbers in FIG. 1, FIG. 6, FIG. 7, and FIG. 8 indicate like elements.

The data processor 18 further comprises a dispensation manager 20. The dispensation manager 20 may comprise one or more of the following: software instructions, software modules, hardware modules, and logic modules. In FIG. 8, the dispensation system manager 20 further comprises a rate controller 50, a vehicle speed estimator 52, and a gain control module 54.

The input data to the data processor 18 or the dispensation system manager 20 comprises one or more of the following input data: ground speed data 56, operator control position data 58, gear ratio data 60, and vehicle tilt data 62. The output data of the data processor 18 or the dispensation system manager 20 comprises control data 64 (e.g., pressure rate and nozzle).

The location determining receiver 10 or another sensor provides ground speed data 56 to the data processor 18 on the vehicle speed estimator 52. The ground speed data 56 may comprise velocity of the vehicle, acceleration of the vehicle, position data and corresponding time stamps of the vehicle, or otherwise. The vehicle speed estimator 52 may estimate current ground speed based on the current velocity, acceleration or position and time stamp data.

The operator control position sensor 112 provides operator control position data 58 to the data processor 18. The rate controller 50 provides distribution rate or control data 64 to the pressure regulator 28, the nozzle controller 39, or both for the distribution system. The rate controller 50 may change the distribution rate or corresponding control signal in response to vehicle speed.

The gain control module 54 controls the sensitivity of the controller 50 to changes in ground speed of the vehicle or estimated changes in ground speed. The gain control module 54 can be set at the factory (e.g., factory programmed) or adjusted by the operator to adjust a sensitivity of a change in rate of the agricultural input to the change in the control position data of the operator control device (e.g., position of a foot pedal, handle or throttle lever). The gain control module 54 supports an operator fine-tuning or adjusting the distribution system and method to achieve a desired distribution pattern, performance or rate within a field based on empirical measurements, sample spraying or distribution runs, tests or otherwise. If the operator increases the gain of the gain control module 54, the data processor 18 or dispensation system manager 20 increases or decreases the distribution rate more rapidly than it otherwise would. However, the operator decreases the gain of the gain control module 54, the data processor 18 or dispensation system manager 20 increases or decreases the distribution rate more slowly than it otherwise would. The data processor 18 or the dispensation system manager 20 is well suited for compensating for the lag in the response of the system or method in response to material change in the acceleration of the vehicle. As used throughout this document, the term material change in acceleration shall mean any change or predicted change of approximately five percent or more in the vehicle ground speed, or any change of approximately three percent or more in acceleration of the vehicle in the direction of travel of the vehicle.

Figure 9:
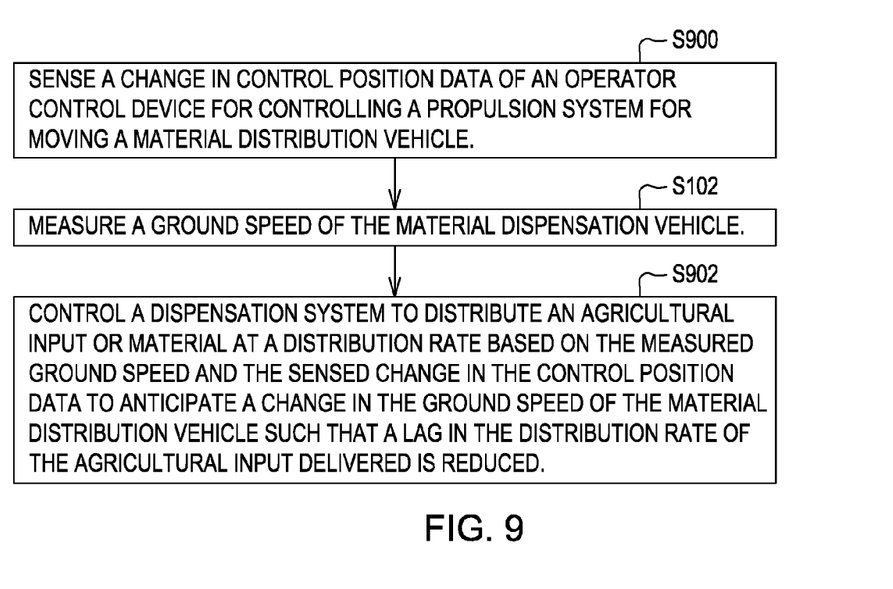
FIG. 9 is a flow chart of one example of a method for controlling a material application system.

FIG. 9 is a flow chart of one example of a method for controlling a material application system. The method of FIG. 9 begins in step S900. Like reference numbers in FIG. 3 and FIG. 9 indicate like steps or procedures.

In step S900, the operator control position sensor 112 or another sensor senses a change in control position data of an operator control device for controlling a propulsion system for moving a material distribution vehicle.

In step S102, the location determining receiver 10 or a ground speed sensor (e.g., an accelerometer coupled to an integrator) measures a ground speed of the material distribution vehicle.

In step S902, a data processor 18 or dispensation system manager 20 controls a dispensation system to distribute an agricultural input or material at a distribution rate based on the measured ground speed and the sensed change in the control position data to anticipate a change in the ground speed of the material distribution vehicle such that a lag in the distribution rate of the agricultural input delivered is reduced. For example, in step S902 the data processor 18 or dispensation system manager 20 may first determine an adjustment factor to estimate an anticipated ground speed based on the measured ground speed and the sensed change in the control position data. Second. the data processor 18 or dispensation system manager 20 may apply the adjustment factor or the anticipated ground speed to control a dispensation system to distribute an agricultural input or material at a distribution rate to anticipate a change in the ground speed of the material distribution vehicle such that a lag in the distribution rate of the agricultural input delivered is reduced during material acceleration or deceleration of the vehicle.

Advantageously, in the method of FIG. 9 the data processor 18 or dispensation system manager 20 reacts as soon as the operator control position sensor 112 detects movement of a user interface or control device by the operator. Other configurations of the method and system herein may react later as soon as such movement of the user interface or control device by the operator results in a change in the metering or fuel, a fuel air mixture, or a change in the throttle position. In the former case, the data processor 18 or dispensation system manager 20 does not need to wait to receive information from a controller or sensor of the propulsion unit (e.g., throttle position sensor) where there could be potential delay or actual delay associated with the processing throughput of an engine control unit from the propulsion system or a delay from propagation or transmission over a busy or active CAN (controller area network) data bus. In the latter case, the change in the metering of fuel, a fuel air mixture or throttle position may be readily available through standard or proprietary data messages available over a CAN data bus or vehicle data bus 22.

Figure 10:
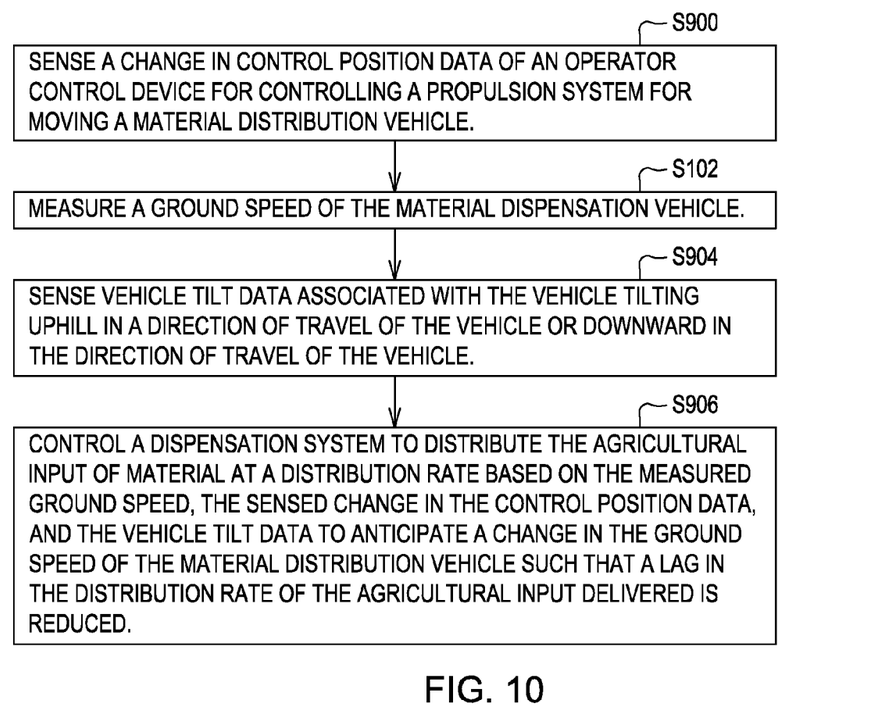
FIG. 10 is a flow chart of another example of a method for controlling a material application system.

FIG. 10 is a flow chart of one example of a method for controlling a material application system. The method of FIG. 10 begins in step S900. Like reference numbers in FIG. 3 and FIG. 10 indicate like steps or procedures.

In step S900, the operator control position sensor 112 or another sensor senses a change in control position data of an operator control device for controlling a propulsion system for moving a material distribution vehicle.

In step S102, the location determining receiver 10 or a ground speed sensor (e.g., an accelerometer coupled to an integrator) measures a ground speed of the material distribution vehicle.

In step S904, a tilt sensor 97 senses vehicle tilt data associated with the vehicle tilting upward (e.g., uphill) or downward (e.g., downhill) in the direction of travel of the vehicle.

In step S906, a data processor 18 or dispensation system manager 20 controls a dispensation system to distribute an agricultural input or material at a distribution rate based on the measured ground speed, the sensed change in the control position data, and the vehicle tilt data to anticipate a change in the ground speed of the material distribution vehicle such that a lag in the distribution rate of the agricultural input delivered is reduced. The data processor 18 or dispensation system manager 20 may use the tilt data to adjust the gain control module 54 or adjust the distribution rate of the agricultural input or material to compensate for deceleration of the vehicle when going uphill and acceleration of the vehicle when going downhill. For example, in step S906 the data processor 18 or dispensation system manager 20 may first determine an adjustment factor to estimate an anticipated ground speed based on the measured ground speed, the sensed change in the control position data, and tilt data. Second. the data processor 18 or dispensation system manager 20 may apply the adjustment factor or the anticipated ground speed to control a dispensation system to distribute an agricultural input or material at a distribution rate to anticipate a change in the ground speed of the material distribution vehicle such that a lag in the distribution rate of the agricultural input delivered is reduced during material acceleration or deceleration of the vehicle.

In an alternate embodiment, the data processor 18 may use additional factors such as the weight or mass of the vehicle, the fuel consumption rate of the vehicle, or the load on the vehicle to further estimate deceleration or acceleration associated with going uphill or downhill for some minimum length of time that tends to result in a material change in the deceleration or acceleration of the vehicle.

Advantageously, in the method of FIG. 10 the data processor 18 or dispensation system manager 20 reacts as soon as the operator control position sensor 112 detects movement of a user interface or control device by the operator. Other configurations of the method and system herein may react later as soon as such movement of the user interface or control device by the operator results in a change in the metering or fuel, a fuel air mixture, or a change in the throttle position. In the former case, the data processor 18 or dispensation system manager 20 does not need to wait to receive information from a control or sensor of the propulsion unit (e.g., throttle position sensor) where there could be potential delay or actual delay associated with the processing throughput of an engine control unit from the propulsion system or a delay from propagation or transmission over a busy or active CAN (e.g., controller area network) data bus. In the latter case, the change in the metering of fuel, a fuel air mixture or throttle position may be readily available through standard or proprietary data messages available over a CAN data bus or vehicle data bus 22.

Figure 11:
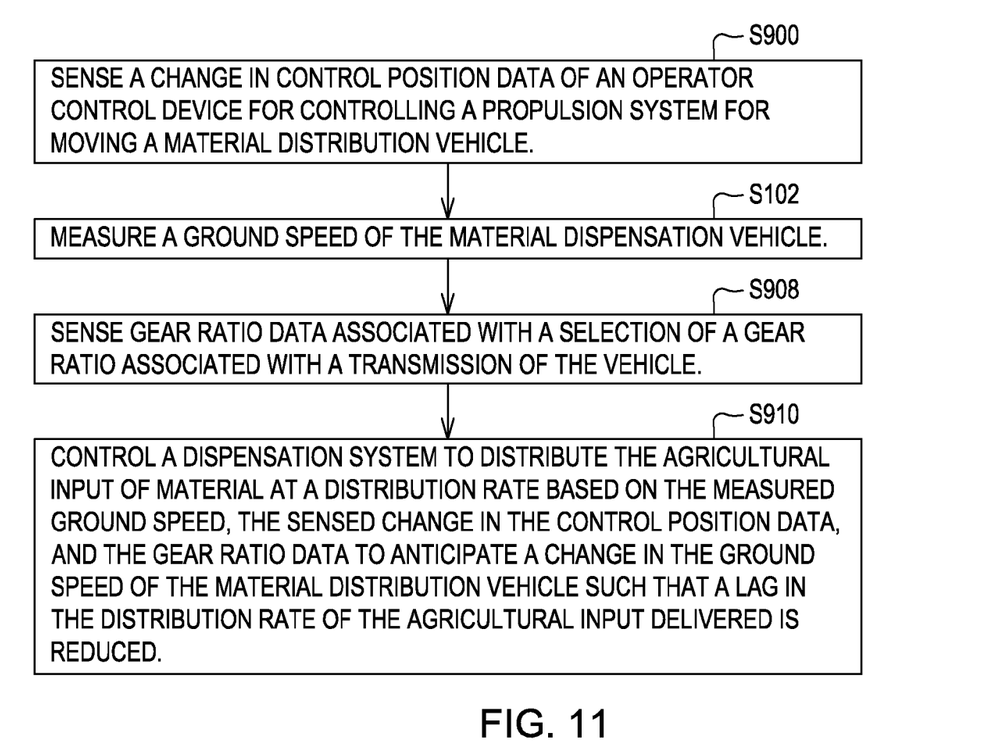
FIG. 11 is a flow chart of yet another example of a method for controlling a material application system.

FIG. 11 is a flow chart of one example of a method for controlling a material application system. The method of FIG. 11 begins in step S900. Like reference numbers in FIG. 3 and FIG. 11 indicate like steps or procedures.

In step S900, the operator control position sensor 112 or another sensor senses a change in control position data of an operator control device for controlling a propulsion system for moving a material distribution vehicle.

In step S102, the location determining receiver 10 or a ground speed sensor (e.g., an accelerometer coupled to an integrator) measures a ground speed of the material distribution vehicle.

In step S908, a transmission sensor 95 senses gear ratio data associated with selection of a gear ratio associated with a transmission of the vehicle. In another example, the transmission sensor 95 senses or determines a gear selection of a gear associated with the transmission of the vehicle.

In step S910, a data processor 18 or dispensation system manager 20 controls a dispensation system to distribute an agricultural input or material at a distribution rate based on the measured ground speed, the sensed change in the control position data, and the gear ratio data to anticipate a change in the ground speed of the material distribution vehicle such that a lag in the distribution rate of the agricultural input delivered is reduced. For example, in step S910 the data processor 18 or dispensation system manager 20 may first determine an adjustment factor to estimate an anticipated ground speed based on the measured ground speed, the sensed change in the control position data, and the gear ratio data. Second. the data processor 18 or dispensation system manager 20 may apply the adjustment factor or the anticipated ground speed to control a dispensation system to distribute an agricultural input or material at a distribution rate to anticipate a change in the ground speed of the material distribution vehicle such that a lag in the distribution rate of the agricultural input delivered is reduced during material acceleration or deceleration of the vehicle.

The data processor 18 or dispensation system manager 20 may use a combination of the current observed ground speed and the ratio data or gear ratio data to adjust the gain control module 54 or adjust the distribution rate of the agricultural input or material to compensate for the impact of the gear ratio, selected gear or ratio on acceleration or deceleration of the vehicle.

In an alternate embodiment, the data processor 18 may use additional factors such as the weight or mass of the vehicle, the fuel consumption rate of the vehicle, or the load on the vehicle to further estimate deceleration or acceleration associated with a particular gear or gear ratio for some minimum length of time that tends to result in a material change in the deceleration or acceleration of the vehicle.

Advantageously, in the method of FIG. 11 the data processor 18 or dispensation system manager 20 reacts as soon as the operator control position sensor 112 detects movement of a user interface or control device by the operator. Other configurations of the method and system herein may react later as soon as such movement of the user interface or control device by the operator results in a change in the metering or fuel, a fuel air mixture, or a change in the throttle position. In the former case, the data processor 18 or dispensation system manager 20 does not need to wait to receive information from a control or sensor of the propulsion unit (e.g., throttle position sensor) where there could be potential delay or actual delay associated with the processing throughput of an engine control unit from the propulsion system or a delay from propagation or transmission over a busy or active CAN (controller area network) data bus. In the latter case, the change in the metering of fuel, a fuel air mixture or throttle position may be readily available through standard or proprietary data messages available over a CAN data bus or vehicle data bus 22.

In any of the methods of FIG. 9 through FIG. 11, inclusive, the method may further comprise determining a position of the material distribution vehicle via a location-determining receiver 10. The data storage device 14 may store prescription data comprising the position of the vehicle versus the distribution rate for the agricultural input to be dispensed via the dispensation system. The data processor 18 or dispensation system manager 20 may adjust the distribution rate based on the position of the material distribution vehicle, the prescription data, the measured ground speed and the sensed change in the control position data to anticipate a change in the ground speed of the material distribution vehicle such that a lag in the distribution rate of agricultural input delivered is reduced in response to a material change in acceleration of the vehicle.

In the absence of the system and method for controlling a material application system in accordance with the invention, when a material distribution vehicle (e.g., a sprayer or spreader) speeds up it tends to under apply material (e.g., spray) to the field or plants, and when the vehicle slows down it tends to over apply material spray to the field or plants. The foregoing misapplication is further exacerbated because material distribution systems (e.g., sprayers and spreaders) have a much higher top ground speed than most other agricultural machines; hence, the material application system is subject the affect of repeated and material changes in acceleration or deceleration in the field. For example, a material distribution vehicle might turn a corner at the end of a field at approximately two to five miles per hour and might accelerate to approximately 10 to 20 miles per hour in the field.

In the absence of the system and method for controlling a material application system in accordance with the invention, the misapplication of material may be caused by the time that it takes a distribution system or its metering component (e.g., rate controller) to adjust mechanically to changes in ground speed or acceleration. For example, if the material application system uses a pump, the pump and its rotational energy source (e.g., hydraulic motor) may lag a command or signal to increase the rotational velocity of the pump or rotational energy source. Further, there can also be lags in the ground speed observation and command processing by data processing and other electronic components.

To address the aforementioned misapplication of material, the embodiments set forth in the drawings and the accompanying text may use the anticipated ground speed or anticipated change in ground speed, rather than merely the observed ground speed of the material distribution vehicle. For example, in the embodiments set forth in FIG. 6 through FIG. 11, inclusive, the system and method is well suited for using a change in position or control position data of an operator control device (e.g., the propulsion handle that an operator adjusts to control the ground vehicle speed of the vehicle) to create an adjustment factor that is added (under positive acceleration) or subtracted (decelerating) from the observed ground speed that is used by the data processor 18 or dispensation system manager 20 (e.g., rate controller). In one configuration, the adjustment factor may be established to present some time decay related to the expected system responses of one or more of the following: the data processor 18, the pump 26, the pressure regulator 28 and the nozzle controller 30. The method and system for managing the dispensation of an agricultural material or input can use the response curves of time versus flow rate or time versus pressure output to establish or fine tune the adjustment factor.

The quality or accuracy of the adjustment factor can be improved to be a very precise indicator of vehicle ground speed in the near future by including in its calculation other supplemental data that is available on the vehicle data bus 22 (e.g., CAN (Controller Area Network) bus of the vehicle. For instance, the supplemental data for enhancing the accuracy of the adjustment factor may comprise throttle position, engine speed, fuel consumption rate, current acceleration, current deceleration, current ground speed, transmission gear ratio, selected transmission gear, tilt (e.g., uphill or downhill in the direction of travel), tank level of the tank 24 for holding the agricultural input or material to be distributed, payload or loading of the vehicle. At least some of foregoing supplemental data can impact the adjustment factor or the estimate of anticipated vehicle speed or change in anticipated vehicle speed by impacting the acceleration or deceleration of the vehicle.

The system and method may be modified or varied in ways from the express disclosure set forth herein that remain within the scope of one or more of the attached claims. For example, different embodiments or variations may relate to (1) variation in the dispensation system for a sprayer or in nozzles, such as variable orifice of nozzles that control rate of distribution of material, or nozzles that adjust rate through pulsing, variable orifices, or multiple nozzle-body methods; (2) variation in the dispensation system for a spreader, such as a slide gate or metering wheel speed that determines application rate; (3) variation in the combination and permutation of data to determine the anticipated speed or adjustment factor based on elevation change in terrain as indicated through a location determining receiver 10, engine load, engine speed, fuel consumption, swash plate angle, hydrostatic pressure, engine throttle position, tank level of the tank 24, and the like; (4) the operator control device for controlling the propulsion unit of the vehicle can have different forms, such as a propulsion handle, a pedal or joystick with or without an infinitely variable transmission, or a combination of gear shifter and throttle with a transmission involving discrete gears. In an alternative embodiment, the anticipated ground speed of the vehicle may be estimated by reading data messages from the vehicle data bus 22 (e.g., CAN data bus) where the vehicle comprises an autonomous or unmanned vehicle.

Having described the preferred embodiment, it will become apparent that various modifications can be made without departing from the scope of the invention as defined in the accompanying claims.

I claim:

1. A method for managing a dispensation of an agricultural input, the method comprising:
   sensing an operator-commanded change in control position data of an operator control device for controlling a propulsion system for moving a material distribution vehicle, the control position data comprising a position or setting of the operator control device detected by a position sensor;
   measuring a ground speed of the material distribution vehicle; and
   prior to the vehicle's reaching an anticipated ground speed based on the operator-commanded change, controlling a dispensation system to distribute an agricultural input or material at a distribution rate based on the measured ground speed and the sensed change in the control position data to anticipate a future change in the ground speed of the material distribution vehicle such that a lag in the distribution rate of the agricultural input delivered is reduced.

2. The method according to claim 1 further comprising:
   sensing vehicle tilt data associated with the vehicle tilting upward in a direction of travel of the vehicle or downward in the direction of travel of the vehicle;
   controlling the dispensation system to distribute the agricultural input of material at a distribution rate based on the measured ground speed, the sensed change in the control position data, and the vehicle tilt data to anticipate a change in the ground speed of the material distribution vehicle such that a lag in the distribution rate of the agricultural input delivered is reduced.

3. The method according to claim 1 further comprising:
   sensing gear ratio data associated with a selection of a gear ratio associated with a transmission of the vehicle;
   controlling the dispensation system to distribute the agricultural input of material at a distribution rate based on the measured ground speed, the sensed change in the control position data, and the gear ratio data to anticipate a change in the ground speed of the material distribution vehicle such that a lag in the distribution rate of the agricultural input delivered is reduced.

4. The method according to claim 1 wherein the controlling further comprises a gain control to adjust a sensitivity of a change in rate of the agricultural input to the change in the control position data.

5. The method according to claim 1 wherein the sensing the change in control position data of an operator control device comprises sensing a change in position of an operator handle or joystick as the operator control device.

6. The method according to claim 1 wherein the sensing the change in control position data of an operator control device comprises sensing a change in position of a foot pedal as the operator control device.

7. The method according to claim 1 further comprising:
   determining a position of the material distribution vehicle via a location-determining receiver;

storing prescription data comprising the position of the vehicle versus the distribution rate for the agricultural input to be dispensed via the dispensation system; and adjusting the distribution rate based on the position of the material distribution vehicle, the prescription data, the measured ground speed and the sensed change in the control position data to anticipate a change in the ground speed of the material distribution vehicle such that a lag in the distribution rate of agricultural input delivered is reduced.

8. The method according to claim 1 where the operator control device comprises at least one an accelerator pedal, a foot pedal, a lever, a throttle lever, a switch, a rotatable knob, a joystick or a slidable control device for controlling a shaft speed or engine speed of the propulsion system.

9. The method according to claim 1 further comprising:
generating, by the position sensor, a signal or data message for the dispensation system prior to the vehicle actually changing its speed or acceleration to reduce or eliminate the time lag that would otherwise be associated with an upcoming change in future vehicle speed.

10. A system for managing a dispensation of an agricultural input, the system comprising:
an operator control device for controlling a propulsion system for moving a material distribution vehicle;
a position sensor for sensing a change in control position data of the operator control device responsive to an operator command, the control position data comprising a position or setting of the operator control device detected by a position sensor;
a location-determining receiver for measuring a ground speed of the material distribution vehicle; and
prior to the vehicle's reaching an anticipated ground speed based on the operator command, a data processor is adapted to control a dispensation system to distribute an agricultural input or material at a distribution rate based on the measured ground speed and the sensed change in the control position data to anticipate a future change in the ground speed of the material distribution vehicle such that a lag in the distribution rate of the agricultural input delivered is reduced.

11. The system according to claim 10 further comprising:
a tilt sensor for sensing vehicle tilt data associated with the vehicle tilting uphill in a direction of travel of the vehicle or downward in the direction of travel of the vehicle;
the data processor configured with instructions to control the dispensation system to distribute the agricultural input of material at a distribution rate based on the measured ground speed, the sensed change in the control position data, and the vehicle tilt data to anticipate a change in the ground speed of the material distribution vehicle such that a lag in the distribution rate of the agricultural input delivered is reduced.

12. The system according to claim 11 wherein the tilt sensor comprises a first accelerometer mounted on a front portion of the vehicle and a second accelerometer mounted on a rear portion of the vehicle, and an evaluator for evaluating whether the first accelerometer measurements differ from second accelerometer measures indicative of the tilt of the vehicle.

13. The system according to claim 10 further comprising:
a transmission sensor for sensing gear ratio data associated with a selection of a gear ratio associated with a transmission of the vehicle;
the data processor configured with instructions to control the dispensation system to distribute the agricultural input of material at a distribution rate based on the measured ground speed, the sensed change in the control position data, and the gear ratio data to anticipate a change in the ground speed of the material distribution vehicle such that a lag in the distribution rate of the agricultural input delivered is reduced.

14. The system according to claim 10 wherein the data processor further comprises a gain control module in the data processor to adjust a sensitivity of a change in rate of the agricultural input to the change in the control position data.

15. The system according to claim 10 wherein the position sensor comprises a sensor for sensing a change in position of an operator handle or joystick as the operator control device.

16. The system according to claim 10 wherein the position sensor comprises a sensor for sensing a change in position data of a foot-operated pedal as the operator control device.

17. The system according to claim 10 further comprising:
the location-determining receiver arranged for determining a position of the material distribution vehicle;
a data storage device coupled to the data processor, the data storage device storing prescription data comprising the position of the vehicle versus the distribution rate for the agricultural input to be dispensed via the dispensation system; and
a dispensation system manager for adjusting the distribution rate based on the position of the material distribution vehicle, the prescription data, the measured ground speed and the sensed change in the control position data to anticipate a change in the ground speed of the material distribution vehicle such that a lag in the distribution rate of agricultural input delivered is reduced.

18. The system according to claim 10 further comprising:
a first nozzle group for distributing the agricultural input;
a second nozzle group for distributing the agricultural input;
a nozzle controller coupled to the first nozzle group and the second nozzle group to control the first nozzle group and the second nozzle group to adjust the distribution rate of the agricultural input consistent with the engine speed data.

19. The system according to claim 10 where the operator control device comprises at least one an accelerator pedal, a foot pedal, a lever, a throttle lever, a switch, a rotatable knob, a joystick or a slidable control device for controlling a shaft speed or engine speed of the propulsion system.

20. The system according to claim 10 wherein the position sensor generates a signal or data message for the data processor prior to the vehicle actually changing its speed or acceleration to reduce or eliminate the time lag that would otherwise be associated with an upcoming change in future vehicle speed.

* * * * *